COUNTER EMPLOYING PLURAL CIRCULATING DELAY-LINE STORES FOR STAGES WITH CARRY FEEDBACK TO EFFECT RESET

Filed Oct. 10, 1960

INVENTOR
Brian Desmond Simmons
BY Larson and Taylor

United States Patent Office 3,148,333 Patented Sept. 8, 1964

3,148,333

COUNTER EMPLOYING PLURAL CIRCULATING DELAY-LINE STORES FOR STAGES WITH CARRY FEEDBACK TO EFFECT RESET

Brian Desmond Simmons, Chislehurst, England, assignor to Associated Electrical Industries Limited, London, England, a British company Filed Oct. 10, 1960, Ser. No. 61,601
Claims priority, application Great Britain Oct. 16, 1959
4 Claims. (Cl. 328—48)

Figures 1, 2:
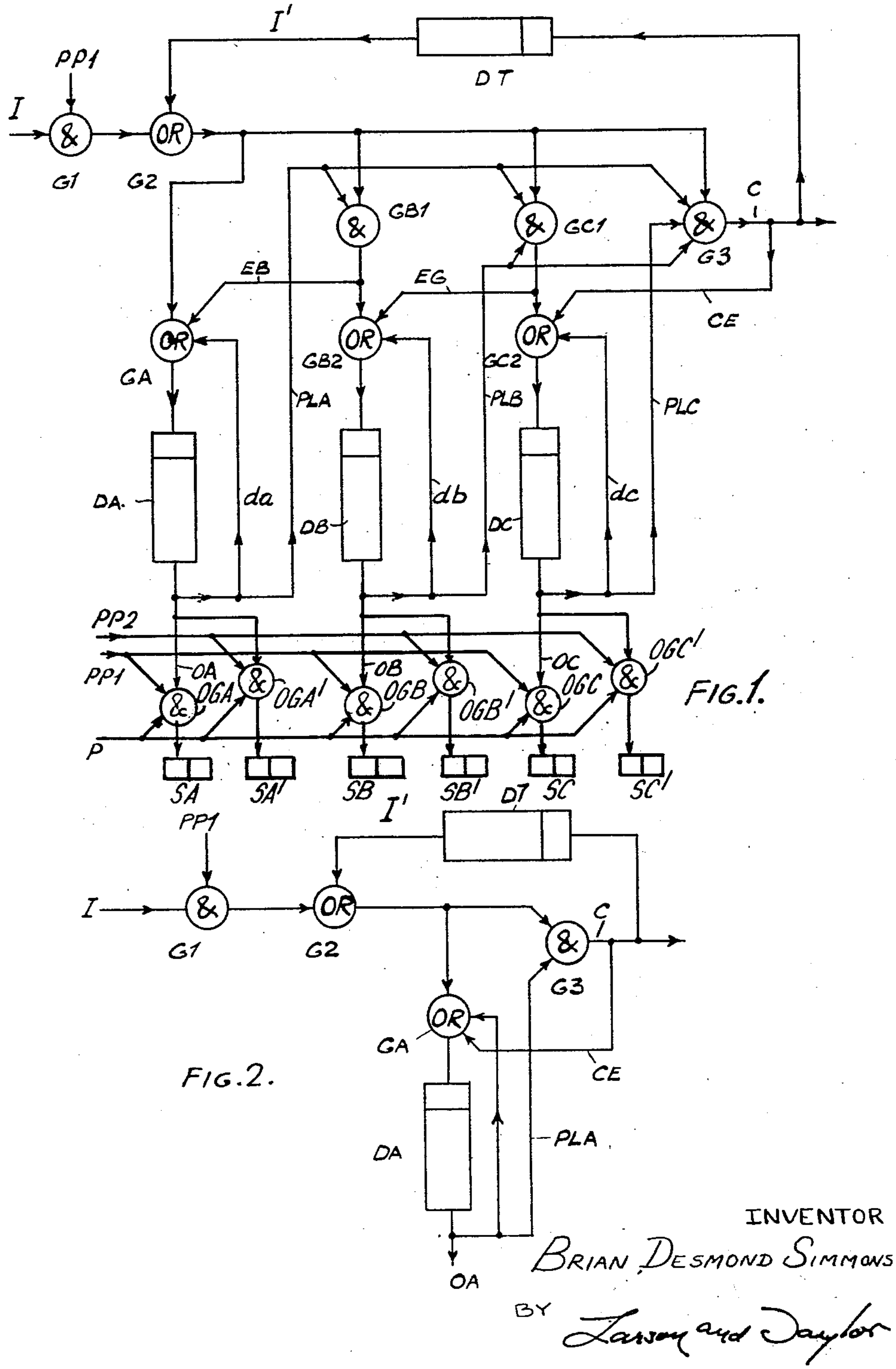

This invention relates to electric pulse counting circuits and is particularly concerned with counting pulses occurring at intervals which may be of variable length with respect to each other but are each an integral multiple of a basic interval. The counter is therefore applicable to the counting of pulses which occur in corresponding time periods in successive cycles of such time periods, there being either a single pulse or no pulse in each such period. In this application the overall cycle period represents a basic time interval of which the interval between the pulses to be counted is an integral multiple. The time periods constituting each cycle may for instance relate to different channels of a time division multiplex system, the counter being required to count the number of pulses received in respect of a particular channel, or individually in respect of each of a number of channels. In the following, corresponding time periods from successive cycles will be referred to as relating to a particular channel, and each such time period will be called a channel period, in accordance with the terminology of time division multiplex systems, but it is to be understood that this mode of reference is used only to facilitate description and that the invention is not limited to counting pulses in time division multplex systems. Each channel perod in a channel cycle will relate to a different channel.

Pulse counters are known which employ circulating delay line stores so inter-related with each other and with a pulse input lead through various gating circuits that the number of pulses which has been received at any time in respect of a particular channel is indicated by the particular combination of stores which then have a pulse circulating in them for that channel. A novel form of such pulse counter also forms the subject of our copending application Serial No. 61,447.

The invention is applicable, in general, where the pulses of a series to be counted are separated by a basic interval greater than the duration of a single pulse. A counter according to the invention includes one or more stages each including a circulating delay line store having a circulation time (access time) which is an integral multiple of the basic interval referred to and is chosen such that an input pulse applied to the store re-appears at the input at a time coincident with that at which the next input pulse of the same series may occur: for instance the access time may be chosen such that an input pulse relating to a particular channel re-appears at the input in a subsequent channel period relating to the same channel, which subsequent channel period may be in the next or some subsequent channel cycle. The counter also includes a "carry" gate which is connected to produce a carry pulse in consequence of the arrival of an input pulse at such time as a pulse relating to the same series is already circulating in the delay line store or, as the case may be, in a particular combination of the delay line stores. This carry pulse is fed as an erasing signal to the delay line store or, as the case may be, to such of the stores as would otherwise be left, following a carry, with a pulse circulating therein for said series, thereby stopping such pulse circulation, and the carry pulse is also fed to a delay line which passes this pulse back to the input of the counter and has a delay so chosen that the pulse arrives at the counter input at a time within the time interval of separation of the pulses being counted. In this way the count can be continued by counting the carry pulses as a separate series in the same counter store or stores but in a time position lying between the original input pulses. If $m$ is the number of such time positions available ($m$ being dependent upon the basic inter-pulse interval in relation to the pulse width and upon whether or not pulses belonging to other series, for example, to other channels, are also contemporaneously able to be counted by the counter) then the capacity of the counter is increased to the $m$th power of its counting capacity in the absence of the feedback: e.g. if $n$ is the number of counting stages, the counting capacity in binary code in $2^{n \times m}$.

In order to give a fuller understanding of the invention and also to explain its mode of operation, reference will be made to the accompanying drawings of which:

FIGS. 1 and 2 respectively illustrate in logical form a multi-stage counter and a single stage counter embodying the invention. The counter FIG. 1 is shown as having three stages but according to the maximum pulse count to be catered for many include a greater or lesser number of stages each based on the same general principles.

It will be assumed that the counter is to be employed in conjunction with a hundred-channel time division multiplex system having, for instance, a cycle period of 100 microseconds ($\mu$s.) and individual channel periods of 1 $\mu$s. each. Channel period relating to the same channel therefore recur at intervals of 100 $\mu$s. It will further be assumed that each channel is itself shared on a time division basis (so that, for instance, successive channel periods relating to the same channel are allocated cyclically to separate but possibly related items of information), and that this time sharing is achieved under the control of time-staggered timing pulse trains in each of which the repetition period of the pulses is prime with respect to the channel cycle period. Consequently the pulses in any one of these pulse trains will coincide with the channel period of a particular channel in only each $r$th cycle, where $r$ is the number of channel periods occurring in the repetition period of the timing pulses in a train: that is, a timing pulse of a particular train will uniquely coincide with a particular channel once in each $r \times p$ channel periods, where $p$ is the number of channel periods per cycle, being 100 in the case assumed. In this case the repetition period of the timing pulses will be assumed to be 9 $\mu$s. so that $r$ is 9 which is not a whole factor of 100, Hence in successive channel cycles channel periods relating to the same channel will coincide with timing pulses from different ones of the time-staggered timing pulse trains, coincidence between a timing pulse of a particular train and a particular channel occurring once in every 900 $\mu$s. Moreover with $r$ equal to 9 and a pulse width of 1 $\mu$s., the number of time-staggered timing pulse trains can be nine. Each channel period can therefore be considered as having one of nine positions as defined by the respective timing pulse trains, having a different time position in each successive cycle.

Referring now to FIG. 1 of the drawing, each counter stage A, B, C . . . comprises a delay line DA, DB, DC . . . having a recirculating path *da, db, dc* . . . between its output and input and also having an individual input gating circuit GA, GB1–GB2, GC1–GC2 as the case may be, of which the gates GA, GB2, GC2 . . . are single-coincidence ("OR") gates included in the recirculating paths of the respective stores. The counter also includes a carry gate G3. The input pulses to be counted are applied to a common input connection I which includes gates G1 and G2 to be considered later and over which they are fed in parallel to the gates GA, GB1, GC1 . . . and also to the carry gate G3. These gates, with the exception of GA, also have priming leads PLA, PLB, PLC, connected to them from the output of the delay line in each preceding stage: thus GB1 has a priming lead PLA from the output of DA, GC1 has priming leads PLA and PLB from both DA and DB, and G3 has priming leads PLA, PLB, PLC from DA, DB and DC. Each of these gates is an "AND" gate (symbolised by &) requiring to be primed on each of its priming leads in order for it to pass a pulse fed to it from the input lead I. An erase lead EB, EC goes from the output of each of the gates GB1, GC1 to the gate GA, GB2 in the preceding stage. An erase lead CE goes from the output of G3 to the gate GC2.

To count a series of pulses appearing in a given channel in a particular time position, the input pulses as fed from line I into the counter are gated in G1 by the timing pulses (PP1) defining that time position. Consequently the first pulse appearing in that channel and in that particular time position passes through GA into DA and recirculates via *da* and GA. The delay line store including DA is given an access time (circulation time) of 900 $\mu$s. so that the circulating pulse re-appears at the input at 900 $\mu$s. intervals, coinciding on each such re-appearance with a subsequent channel period relating to the same channel and in the same time position. At the same intervals the circulating pulse passes over lead PLA as a priming pulse to gates GB1, GC1 and G3. Consequently when the second of the pulses to be counted appears on input lead I, it finds gate CB1 fully primed but not GC1, because this latter gate requires also to be primed from DB. This second pulse therefore passes through GB1 into DB and in doing so inhibits GA over EB, thereby erasing the original pulse circulating in DA, *da*, GA. The next channel pulse passes into DA. It is not passed by GC1 because although this gate is now primed from DB it is no longer primed from DA in the absence of a circulating pulse in the latter. After the receipt of this third pulse there is a pulse circulating for the relevant channel in both DA and DB. The next input pulse passes into DC via GC1, which is at this time coincidentally primed from DA and DB. The pulse passed by GC1 also inhibits GB2 thereby erasing the pulse in DB, *db*, GB2. Since GB1 was primed from DA coincidentally with the fourth pulse this pulse also passes through GB1 to inhibit GA and thereby erase the relevant pulse in DA, *da*, GA. Following the fourth pulse therefore a pulse is left circulating in DC, *dc*, GC2 but not in the preceding stores.

Similar actions take place in respect of subsequent input pulses of the same series in such manner that at any time the number of pulses which has been received in the particular (PP1) time position of the particular channel is indicated in binary code by the particular combination of stores which then have a pulse circulating in them for that time position of the channel. The maximum count, reached when a pulse is circulating in each of the stores, is seven for the three stage counter as shown. An eighth pulse in the same channel finds G3 primed on each of its priming leads PLA, PLB, PLC. Consequently G3 passes this eighth pulse to a carry lead C. This carry pulse also inhibits GC2 to erase the channel pulse circulating in DC, *dc*, GC2. The eighth channel pulse also passes through GB1 and GC1 (coincidentally primed from DA and from DA and DB respectively) and thereby erases at GA and GB2 the relevant pulse circulating through DA and DB. The three counter stages are therefore cleared in respect of the particular channel and time position and can go through a similar counting cycle in response to subsequent pulses in the same channel and time position, a carry pulse being produced each time the counter reaches a multiple of eight.

If desired a carry pulse may be taken after any required number of input pulses less than the maximum capacity of the counter, that is, the counter may be arranged to count to some number less than the maximum of which it is capable. For instance a three stage counter as shown may be required to count in fives, or a four stage counter may be required to count in tens. In such a circumstance the carry gate G3 would have connected to it only those of the priming connections PLA, PLB, PLC which will have pulses on them at the time of occurrence of the input pulse in response to which a carry pulse has to be produced. In order that, following this carry, the counter will be left clear, ready to start a new counting cycle for subsequent input pulses, the inhibiting erase lead from the carry gate may have to be taken not only to the input "OR" gate of the last delay line store but also to the input "OR" gates of certain others of the stores depending on the counting code and on the count at which the carry is to be produced. In general the erase lead from the carry gate has to be taken to the input "OR" gate of those stores in which a pulse is circulating in respect of the pulse sequence being counted, and has therefore to be erased, or for which the respective input "AND" gates are fully primed and the existing erase leads to their input "OR" gates come from stages in which the "AND" gates are not fully primed, so that in the absence of any other inhibition on the input "OR" gates the input pulse producing the carry would also pass into these stores and begin circulating therein. For example, if the counter illustrated is required to count in fives, giving a carry on each fifth input pulse of a sequence being counted, then only priming lead PLC would be taken to gate G3 (which would now be a coincidence-of-two gate) and the erase lead CE would be taken additionally at least to gate GA. This would be necessary because following the fourth count no pulse is circulating via delay line DA and gate GB1 is therefore not primed to pass the fifth pulse, which will therefore not inhibit itself, at gate GA via erase lead EB, from passing into delay line DA. Since no pulse is circulating via delay line DB and gate GB1 is not primed to pass the fifth input pulse, erase lead CE would not need to be taken to gate GB2 in the circumstances being considered.

The counter of FIG. 1, as so far described, conforms to that forming the subject of our copending application Serial No. 61,447.

In accordance with the present invention the carry pulse appearing on lead C is also taken to a delay line DT having a delay time which is a multiple (one or more times) of the channel cycle period and is chosen such that the pulse re-appears at its output coincidentally with a channel period of the same channel but in a different time position, that is, a time position defined by one of the timing pulse trains other than PP1. For instance the delay of DT may be made 100 $\mu$s. (equal to a channel cycle period) so that the pulse at its output has the time position defined by the timing pulse train (PP2) immediately following the train PP1 in the staggered time relationship of these pulse trains. Since the pulses originally fed into DA are all in the PP1 time position (whether they are pulses in the particular channel being considered or in other channels of the multiplex system), the time positions corresponding to the PP2 timing pulses are free in the delay line DA and likewise in the delay lines DB, DC . . . . The carry pulses produced by gate G3 can therefore be counted by the counter using the PP2 time positions in the delay line stores A, B, C. . . . To this end the carry pulses delayed by DT and appearing on an auxiliary input lead I' are fed to the input of the counter proper by way of the combining gate G2 and are counted, in binary code, by the three stages of the counter in a manner exactly analogous to that already described but this time using the PP2 time positions. If the maximum count of the counter in the PP2 position is reached, carry pulses produced by gate G3 in this time position and applied to the delay line DT can be counted in a similar manner using another (PP3) time position (assuming it to be available for this purpose), and so on.

The single stage counter of FIG. 2 corresponds to that of FIG. 1 but omits stages B and C of the latter. The reference characters used in FIG. 2 correspond to those used in FIG. 1 in order to show the correspondence between the two circuits. The delays of delay lines DA and DT may again be assumed to be 900 $\mu$s. and 100 $\mu$s. respectively. In FIG. 2 a carry pulse is produced by G3 on every second count. This carry pulse erases the existing pulse circulating in DA-*da*-GA2 and is fed through the delay line DT to enter the DA delay line store in a new time position. The count is indicated in binary code according to the combination of time positions in which a pulse is circulating for a particular channel at any time.

In the counter of FIG. 1 or FIG. 2 the count stored for a particular channel and time position of the input pulses can be abstracted by way of output leads OA, OB, OC . . . in FIG. 1 or OA in FIG. 2. One way in which this can be done is indicated by way of example in FIG. 1. The output leads OA, OB, OC are shown as going to a first set of output gates OGA, OGB, OGC each having a first priming lead to which is applied the (PP1) timing pulse train defining the time position in which the input pulses to the counter are first counted, and to a second set of output gates OGA′, OGB′, OGC′ to which is applied the (PP2) timing pulse train defining the time position in which the carry pulses are counted. All these output gates have a second priming lead to which pulses (P) coinciding with successive channel periods of the particular channel concerned, are applied when it is desired to abstract the count. Coincidence of a channel pulse (P) with a PP1 pulse opens the gates OGA, OGB, OGC to pass to staticisers SA, SB, SC the pulses which are circulating in delay lines DA, DB, DC in the PP1 time position of the particular channel. As a result, the staticisers SA, SB, SC, which may each be constituted by a bistable two-state circuit many forms of which are well known, become set to a combination of states representing in binary code the first order pulse count. Likewise coincidence of a channel pulse (P) with a PP2 pulse opens gates OGA′, OGB′, OGC′ to pass to staticisers SA′, SB′, SC′ the pulses which are circulating through delay lines DA, DB, DC in the PP2 time position, that is, the circulating pulses resulting from the carry pulses passed by gate G3. Staticisers SA′, SB′, SC′ therefore become set to a combination of their states representing in binary code the second order pulse count, that is, the number of carry pulses which have occurred. The total pulse count is thus represented by the combined states of all the staticisers SA, SB, SC, SA′, SB′, SC′.

The delay lines DA, DB, DC may take any known form, being for instance mercury or magnetostrictive delay lines. Many forms of "OR" and "AND" gates, and ways of inhibiting them if necessary, are also well known. It is therefore thought that the logical form of representation used in the drawings constitutes a fully adequate disclosure of the invention without requiring specific circuit or other details for the delay lines and gates.

Whereas the embodiment of the invention illustrated in FIG. 1 counts the input pulses in binary code, it is to be understood that the invention may equally be applied to counters counting in other codes.

What I claim is:

1. A pulse counter for counting a series of input pulses separated by time intervals that are each an integral multiple of a basic interval greater than the duration of a single pulse, comprising a circulating delay line store constituted by a delay line having a recirculating path between its input and output ends, said store having a circulation time which is such an integral multiple of said basic interval that an input pulse entering the store will reappear at its input via said recirculating path at a time coincident with that at which the next pulse of the same series may occur, an input connection connected to said store for applying thereto the pulses to be counted, an AND gate having input leads connected respectively to said input connection and to the recirculation path of said store for applying to said gate the input pulses and circulating pulses reappearing at the input of the store, said gate producing a carry pulse on coincidence of an input pulse with a circulating pulse belonging to the same series, an erase lead connected between said gate and the delay line store for applying such carry pulse to the store as an erase signal for erasing said circulating pulse from the store, and a further delay line connected between said AND gate and the input for re-entering the carry pulses into the counter, said further delay line having a delay time so chosen that the carry pulses will be re-entered into the counter at times within the separation intervals of the input pulses of said series being counted.

2. A pulse counter for counting a series of input pulses separated by time intervals that are each an integral multiple of a basic interval greater than the duration of a single pulse, comprising a plurality of counting stages each including a circulating delay line store constituted by a delay line have a recirculating path between its input and output ends, each said store having a circulation time which is such an integral multiple of said basic interval that an input pulse entering the store will reappear at its input at a time coincident with that at which the next input pulse of the same series may occur, an input connection connected to said stores for applying thereto the pulses to be counted, an AND gate having input leads connected respectively to said input connection and to the recirculation paths of a particular combination of said stores for applying to said gate the input pulses and circulating pulses reappearing at the inputs of these stores, said gate producing a carry pulse on coincidence of an input pulse with a circulating pulse belonging to the same series in each of the stores of said combination, an erase lead connected between said gate and certain of the delay line stores for applying said carry pulse to these stores as an erase signal for erasing said circulating pulses therefrom, these certain delay line stores being those in which a pulse would otherwise have been left circulating in respect of the series being counted, and a further delay line connected between said AND gate and the input of the counter for re-entering the carry pulses into the counter, said further delay line having a delay time so chosen that the carry pulses wil be re-entered into the counter at times within the separation intervals of the input pulses of said series being counted.

3. A counter as claimed in claim 2 for counting a series of pulses occurring in periodically recurring channel periods allocated to a particular time channel shared by a number of such pulse series on a time division basis determined by time-staggered timing pulse trains in each of which the pulse repetition period is not a whole factor of the recurrence period of said channel periods, wherein each of the circulating delay line stores has a circulation time equal to $r$ times the channel cycle period, $r$ being the number of channel periods occurring in the repetition period of the timing pulses in each train thereof, and the input connection connected to the stores includes a further AND gate having input leads for respectively receiving the input pulses of a series to be counted and the time pulses of the pulse train relating to that series, said further delay line over which the carry pulses are re-entered having a delay time which is such a multiple of the channel cycle period that a carry pulse will arrive at the counter input coincidentally with a channel period relating to the same channel and with a timing pulse of another train thereof.

4. A pulse counter comprising in operative association at least one counting stage constituted by a circulating delay line store, means for applying to the input of the counter for counting in a first time position therein a series of input pulses separated by time intervals that are each an integral multiple of a basic interval greater than the duration of a single pulse, an AND gate connected to the counter for producing a carry pulse on each count of a given number of pulses not greater than the maximum counting capacity of the counter in said first time position, and a further delay line connected between said AND gate and the counter input for re-entering such carry pulses into the counter, said further delay line having a delay such that the carry pulses are re-entered and counted in a different time position.

References Cited in the file of this patent

UNITED STATES PATENTS

| | | |
|---|---|---|
| 2,827,566 | Lubkin | Mar. 18, 1958 |

FOREIGN PATENTS

| | | |
|---|---|---|
| 1,162,582 | France | May 22, 1956 |

OTHER REFERENCES

"Arithmetic Operations in Digital Computers," by R. K. Richards, Van Nostrand Co., Inc., Princeton, N.J., 7th printing, copyright 1955, pp. 194–198, FIG. 7–3.

"Digital Computer Components and Circuits," by R. K. Richards, Van Nostrand Co., Inc., Princeton, N.J., reprinted February 1958, copyright 1955, pp. 282–286.